_(12)_ United States Patent
Izawa

(10) Patent No.: US 8,400,652 B2
(45) Date of Patent: Mar. 19, 2013

(54) PORTABLE TERMINAL APPARATUS, AND PRINTING SYSTEM AND METHOD FOR DETERMINING PRINTABLE IMAGE DATA

(75) Inventor: Fumiyuki Izawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 841 days.

(21) Appl. No.: 11/572,991

(22) PCT Filed: Aug. 23, 2005

(86) PCT No.: PCT/JP2005/015292
§ 371 (c)(1),
(2), (4) Date: Jan. 30, 2007

(87) PCT Pub. No.: WO2006/022271
PCT Pub. Date: Mar. 2, 2006

(65) Prior Publication Data
US 2008/0030780 A1    Feb. 7, 2008

(30) Foreign Application Priority Data

Aug. 27, 2004    (JP) .................................. 2004-248096

(51) Int. Cl.
*G06F 3/12*    (2006.01)
*H04N 5/225*    (2006.01)

(52) U.S. Cl. .................................... 358/1.15; 348/207.2

(58) Field of Classification Search ................ 358/1.15; 348/207.2
See application file for complete search history.

(56) References Cited

U.S. PATENT DOCUMENTS

| | | | |
|---|---|---|---|
| 6,972,856 B1 * | 12/2005 | Takahashi | 358/1.14 |
| 2001/0048534 A1 * | 12/2001 | Tanaka et al. | 358/1.16 |
| 2002/0093682 A1 * | 7/2002 | Nakajima | 358/1.16 |
| 2004/0041865 A1 * | 3/2004 | Yano et al. | 347/14 |
| 2004/0041913 A1 * | 3/2004 | Takasumi et al. | 348/207.2 |

FOREIGN PATENT DOCUMENTS

| | | |
|---|---|---|
| CN | 1469305 A | 1/2004 |
| EP | 1 085 740 A2 | 3/2001 |
| EP | 1 370 060 A1 | 12/2003 |
| JP | 11-155120 | 6/1999 |

(Continued)

OTHER PUBLICATIONS

Technical Standardization Committee on AV & IT Storage Systems and Equipment, "JEITA CP-3451—Exchangeable image file format for digital still cameras: Exif Version 2.2", Apr. 2002, Japan Electronics and Information Technology Industries Association, All pages.*

(Continued)

*Primary Examiner* — Twyler Haskins
*Assistant Examiner* — Fred Guillermety
(74) *Attorney, Agent, or Firm* — DLA Piper LLP (US)

(57) ABSTRACT

A portable terminal apparatus confirms whether it conforms to an image data sending and receiving method to which an image forming apparatus for printing image data can be adapted, and receives data of the printable image format from the image forming apparatus. The portable terminal apparatus displays image identification data for identifying each piece of stored image data, and determines whether each piece of the image data is printable, based on at least one of a result of the confirmation with respect to the sending and receiving method, the image format information, and the image data. Based on a result of the determination, the display is controlled so that the user can distinguish whether each piece of the image data is printable. Among image data selected by the user, printable image data due to the determination is sent to the image forming device.

17 Claims, 10 Drawing Sheets

FOREIGN PATENT DOCUMENTS

| | | |
|---|---|---|
| JP | 2001-086452 | 3/2001 |
| JP | 2001-218096 | 8/2001 |
| JP | 2003-023566 | 1/2003 |
| JP | 2003229981 A | 8/2003 |
| JP | 2003330675 A | 11/2003 |

OTHER PUBLICATIONS

Chinese language office action and its English translation for corresponding Chinese application No. 200580027709.X.

Japanese language office action and its English language translation for corresponding Japanese application 2006531922.

Chinese language office action dated Nov. 24, 2011 and its English language translation for corresponding Chinese application 200580027709.

Chinese language appeal decision dated Aug. 9, 2012 and its English language translation issued in corresponding Chinese application 200580027709.X.

* cited by examiner

PORTABLE TERMINAL APPARATUS, AND PRINTING SYSTEM AND METHOD FOR DETERMINING PRINTABLE IMAGE DATA

TECHNICAL FIELD

The present invention relates to a portable terminal apparatus directly connected to a printer or the like via a cable, so as to output image data to the printer, and also relates to a printing system and a corresponding method.

Priority is claimed on Japanese Patent Application No. 2004-248096, filed Aug. 27, 2004, the content of which is incorporated herein by reference.

BACKGROUND ART

As a conventional technique, a digital camera is generally known which is directly connected to a printer via a cable, so as to make the printer print an image designated by a user (see, for example, Patent Documents 1 and 2). In addition, recently, a camera may be installed in a portable terminal apparatus such as a cellular phone or a PDA (personal digital assistant). The camera installed in such a portable terminal apparatus has a high pixel density so as to have performance similar to that of the digital camera. Accordingly, there are market needs requiring that the portable terminal apparatus also have the distinctive techniques of the digital camera. Such distinctive techniques include the above function of being connected directly to the printer via a cable, so as to print images.

Patent Document 1: Japanese Unexamined Patent Application, First Publication No. H11-155120
Patent Document 2: Japanese Unexamined Patent Application, First Publication No. 2001-218096

However, the portable terminal apparatus has a data communication function; thus, it stores image data having various formats, such as images obtained from web pages on the Internet, or images appended to received emails. Therefore, not only the image captured by the user itself (as when using the digital camera), but also, for example, the top-page image of the portable terminal apparatus, created by another person and sold on the Internet, may be downloaded and printed. In most cases, such a top-page image is copyrighted; thus, leaving such unauthorized printing comes into question in consideration of the protection of the copyright applied to image data. On the other hand, recently, the digital camera or a digital video camera may have a communication module so as to have a data communication function similar to the cellular phone or the like. Such a device also causes a similar question to that discussed above.

DISCLOSURE OF THE INVENTION

In light of the above circumstances, an object of the present invention is to provide a portable terminal apparatus, and a printing system and a relevant method, by which the user can discriminate image data, printing of which is prohibited due to copyright or the like, or by which printing of such image data can be restricted.

Therefore, the present invention provides a portable terminal apparatus comprising:
an image storage part (e.g., an image storage part 17 in an embodiment explained later) for storing image data;
a display device (e.g., a display part 11 in the embodiment) for displaying image identification data for identifying each piece of the image data stored in the image storage part, in accordance with an operation by a user of the portable terminal apparatus, wherein the image identification data is linked with the piece of the image data;
a determination device (e.g., a determination device 13*b* in the embodiment) for determining whether each piece of the image data stored in the image storage part is printable, based on the image data; and
a display control device (e.g., a display control device 13*a* in the embodiment) for controlling the display of the display device based on a result of the determination by the determination device, so that the user is able to distinguish whether each piece of the image data displayed on the display device is printable.

Preferably, the portable terminal apparatus further comprises a connection device (e.g., a connection part 16 in the embodiment) for outputting a signal of the image data.

In a typical example, the portable terminal apparatus further comprises:
a confirmation device (e.g., a control part 13 in the embodiment) for confirming an image data sending and receiving method to which an image forming apparatus (e.g., a printing apparatus 20 in the embodiment) connected via the connection device can be adapted, wherein:
the determination device determines whether each piece of the image data stored in the image storage part is printable, based on at least one of a result of the confirmation performed by the confirmation device, and the image data.

In another typical example, the portable terminal apparatus further comprises:
a receiving device (e.g., a control part 13 in the embodiment) for receiving image format information of a printable image format from an image forming apparatus (e.g., a printing apparatus 20 in the embodiment) connected via the connection device, wherein:
the determination device determines whether each piece of the image data stored in the image storage part is printable, based on at least one of the image format information and the image data.

The portable terminal apparatus mat further comprise:
an image sending device (e.g., an image sending device 13*c* in the embodiment) for outputting a signal of the image data using the connection device when the user selects desired image data for printing and enters a command for printing, wherein among the desired image data, printable image data determined by the determination device is output by the image sending device.

In a typical example, the image identification data is a file name assigned to each piece of the image data; and
the image storage part stores each piece of the image data and the corresponding file name, which are associated with each other.

The image identification data may be the image data itself stored in the image storage part.

The image identification data may be reduced image data (e.g., thumbnails 110 in the embodiment) obtained by reducing the image data stored in the image storage part. In this case, the image storage part stores each piece of the image data and the reduced data corresponding thereto, which are associated with each other.

In a preferable example, when the image identification data is displayed with a background color on the display device, the display control device uses a first background color (e.g., when a background color is applied in the embodiment) if the image data is printable, and uses a second background color (e.g., when no background color is applied in the embodiment) if the image data is non-printable.

When the image identification data is displayed on the display device, the display control device may not display the image identification data of non-printable image data on the display device.

On the other hand, when the image identification data is displayed on the display device, the display control device may display only the image identification data of printable image data on the display device.

In another preferable example, each piece of the image data stored in the image storage part includes copyright setting data for indicating whether the relevant image data is copyrighted; and when the copyright setting data indicates that the image data is copyrighted, the determination device determines that the relevant image data is non-printable.

In a typical example, to each piece of the image data stored in the image storage part, a file name is assigned which includes an extension (e.g., extension "JPG" of JPEG format) indicating a format of the relevant image data; and when the extension conforms to the image format information received by the receiving device, the determination device determines that the relevant image data is printable.

In another typical example, the printable image format is a predetermined data format (e.g., an extended JPEG format) including a header or a footer; and when the relevant image data does not conform to the predetermined data format, the determination device determines that the relevant image data is non-printable.

In this case, when the header or the footer of the predetermined data format does not include a specific data for determining whether printing is permitted (e.g., data written in a copyright setting area 108 or a free area 109 in the embodiment), the determination device may determine that the relevant image data is printable.

On the other hand, when the header or the footer of the predetermined data format includes a specific data for determining whether printing is permitted (e.g., data written in a copyright setting area 108 or a free area 109 in the embodiment), if the specific data includes data (e.g., "KENNRI00" in the embodiment) which indicates that the printing is permitted, the determination device determines that the relevant image data is printable, and if the specific data includes data (e.g., "KENNRI01" in the embodiment) which indicates that the printing is not permitted, the determination device determines that the relevant image data is non-printable.

The portable terminal apparatus may further comprise:

means for storing, in an inner storage area thereof, data of the predetermined data format included in the image format information when the image format information is received by the receiving device.

The portable terminal apparatus may further comprise:

a communication part connected via a network to a server apparatus which stores image data; and a storage device for storing the image data into the image storage part when the image data is received via the communication part from the server apparatus.

The present invention provides a printing system (e.g., a printing system 1 in an embodiment explained below) having an image forming apparatus (e.g., a printing apparatus 20 in the embodiment) for printing image data and a portable terminal apparatus (e.g., a portable terminal apparatus 10 in the embodiment) connected to the image forming apparatus, wherein:

the portable terminal apparatus comprises:

a connection device (e.g., a connection part 16 in the embodiment) connected to the image forming apparatus;

a confirmation device (e.g., a control part 13 in the embodiment) for confirming, between the portable terminal apparatus and the image forming apparatus, an image data sending and receiving method to which the image forming apparatus can be adapted;

a receiving device (e.g., the control part 13 in the embodiment) for receiving image format information of a printable image format from the image forming apparatus;

an image storage part (e.g., an image storage part 17 in an embodiment explained later) for storing each piece of image data;

a display device (e.g., a display part 11 in the embodiment) for displaying image identification data for identifying each piece of the image data stored in the image storage part, in accordance with an operation by a user of the portable terminal apparatus;

a determination device (e.g., a determination device 13b in the embodiment) for determining whether each piece of the image data stored in the image storage part is printable, based on at least one of a result of the confirmation performed by the confirmation device, the image format information, and the image data;

a display control device (e.g., a display control device 13a in the embodiment) for controlling the display of the display device based on a result of the determination by the determination device, so that the user is able to distinguish whether each piece of the image data displayed on the display device is printable; and an image sending device (e.g., an image sending device 13c in the embodiment) for sending the image data to the image forming apparatus when the user selects desired image data for printing and enters a command for printing, wherein among the desired image data, printable image data determined by the determination device is sent to the image forming device, and the image forming apparatus comprises:

an ability data sending device (e.g., an ability data sending device 22b in the embodiment) for sending the image format information to the portable terminal apparatus;

an image receiving device (e.g., an image receiving device 22c in the embodiment) for receiving the image data sent from the portable terminal apparatus; and an output device (e.g., an output part 21 in the embodiment) for outputting the image data received by the image data as a print.

The present invention also provides a printing method comprising the steps of:

storing image data;

displaying image identification data for identifying each piece of the stored image data, in accordance with an operation by a user of the portable terminal apparatus, wherein the image identification data is linked with the piece of the image data;

determining whether each piece of the stored image data is printable, based on the image data; and controlling display in the displaying step based on a result of the determination, so that the user is able to distinguish whether each piece of the displayed image data is printable.

In accordance with the present invention, it is possible to obtain a portable terminal apparatus, and a printing system and a relevant method, by which the user can discriminate image data, printing of which is prohibited due to copyright or the like, or by which printing of such image data can be restricted.

BEST MODE FOR CARRYING OUT THE INVENTION

Hereinafter, a portable terminal apparatus and a printing system as an embodiment in accordance with the present invention will be described with reference to the appended figures.

Figure 1:
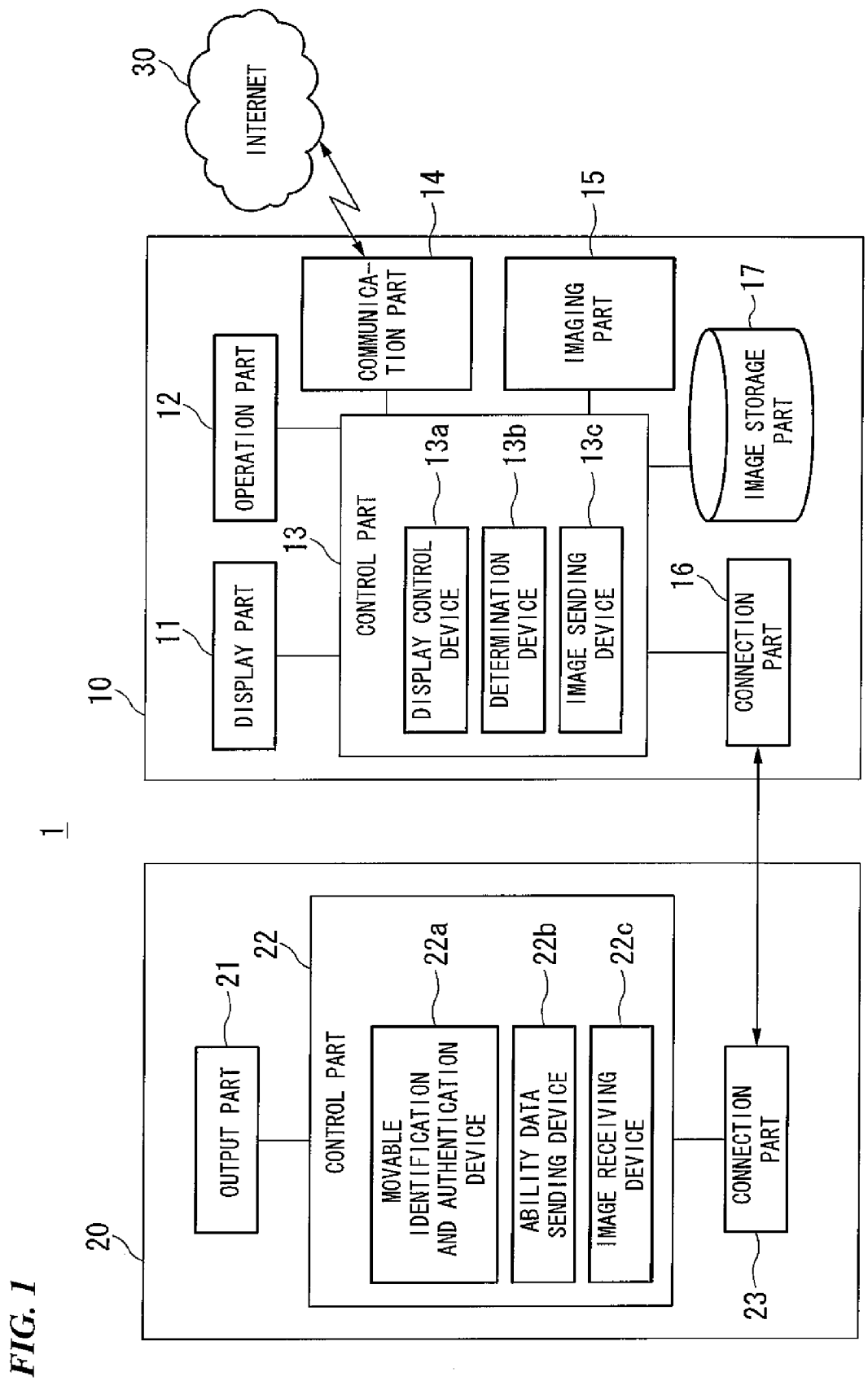
FIG. 1 is a block diagram showing the structures of a portable terminal apparatus and a printing system as an embodiment in accordance with the present invention.

FIG. 1 is a general block diagram showing a printing system 1 consisting of a portable terminal apparatus 10 and a printing apparatus 20 in the present embodiment. In FIG. 1, the printing apparatus 20 corresponds to the above-described image forming apparatus, and may be a printer which can be connected directly to a digital camera or the like via a USB (universal serial bus) cable, and has a direct printing function of directly receiving image data from the digital camera or the like, not via a personal computer.

In the printing apparatus 20, a connection part 23 is a connection interface such as the above-described USB, and is connected directly to the portable terminal apparatus 10 which is explained later. A control part 22 controls print processing of image data in the printing apparatus 20, and has a movable identification and authentication device 22a, an ability data sending device 22b, and an image receiving device 22c.

In the control part 22, when detecting via the connection part 23 that the printing apparatus 20 and the portable terminal apparatus 10 are connected to each other, the movable identification and authentication device 22a determines whether the portable terminal apparatus 10 conforms to an image data sending and receiving method employed by the printing apparatus 20. If it conforms to the image data sending and receiving method, the movable identification and authentication device 22a authenticates the portable terminal apparatus 10. When the portable terminal apparatus 10 is authenticated by the movable identification and authentication device 22a, the ability data sending device 22b sends data, such as an image data format printable by the printing apparatus 20, to the connected portable terminal apparatus 10. The image receiving device 22c requests the portable terminal apparatus 10 via the connection part 23 to send image data, and receives the image data.

In the printing apparatus 20, an output part 21 prints the image data received by the receiving device 22c onto a paper or the like.

Also in FIG. 1, the portable terminal apparatus 10 may be a cellular phone terminal, which can capture an image using a built-in camera, and has a function of performing communication by accessing the Internet or the like. In the portable terminal apparatus 10, a connection part 16 may be a USB interface, and is connected directly to the printing apparatus 20. An imaging part 15 may be a CCD (charge coupled device) camera built in the portable terminal apparatus 10, and captures an image in accordance with an operation by the user. A communication part 14 is wirelessly connected to the Internet 30, downloads image data from a server connected to the Internet 30 in accordance with a designation by the user, and receives emails to which image data is appended.

An image storage part 17 stores the image data obtained by the imaging part 15 and the image data received by the communication part 14, where each piece of the stored image data has a specific file name assigned by an operation by the user, or provided voluntarily by a control part 13. A display part 11 may be a liquid crystal display, and reads and shows the file names corresponding to the image data stored by the image storage part 17, in accordance with an operation by the user. The display part 11 is also used for showing a subject when the imaging part 15 captures an image. An operation part 12 may be a keyboard, which can be operated by the user.

The control part 13 has a function of storing the image data obtained by the imaging part 15 and the image data received by the communication part 14 into the image storage part 17, and includes a display control device 13a, a determination device 13b, and an image sending device 13c. When the user operates the operation part 12 to issue a designation for reading the image data or the file names from the image storage part 17 and display the read data, the determination device 13b of the control part 13 determines whether the relevant image data is printable with reference to copyright data or the like, which is assigned to the image data.

The display control device 13a displays the file names of the image data on the display part 11 in a manner such that the user can distinguish between printable image data and non-printable image data, both having been determined by the determination device 13b. When receiving a designation issued by the user for executing the printing, the image sending device 13c sends only the printable image data (determined by the determination device 13b) to the printing apparatus 20 via the connection part 16.

Instead of physically and directly connecting the portable terminal apparatus 10 and the printing apparatus 20 to each other via the USB cable or the like, they may be connected using (i) a wireless communication device which operates based on the standard called "Bluetooth", or (ii) an infrared communication device which operates based on the standard called "IrDA".

Instead of using the connection interface such as USB, the image data signal may be output to a memory card. In an example of the printing reservation function using DPOF (digital print order format), an image for multiple printing (i.e., printing the image several times) is selected, the image size for printing and the number of prints of the image are designated, and relevant data to which a printing reservation flag is applied is stored in a memory card. When this memory card having the printing reservation is connected to a printer, the printer detects the printing reservation flag, and the designated image can be automatically printed a designated number of times with the designated size. The present invention can also be applied to such a printing reservation function, specifically to a screen display for selecting image data to be stored in the memory card for the printing reservation. That is, similar effects can be obtained when identification data of only printable image data is displayed, or a background color of such data is changed.

In addition, on the display part 11, not only the file names but also the image data itself or thumbnails (explained later) of the image data may be displayed.

Figure 2:
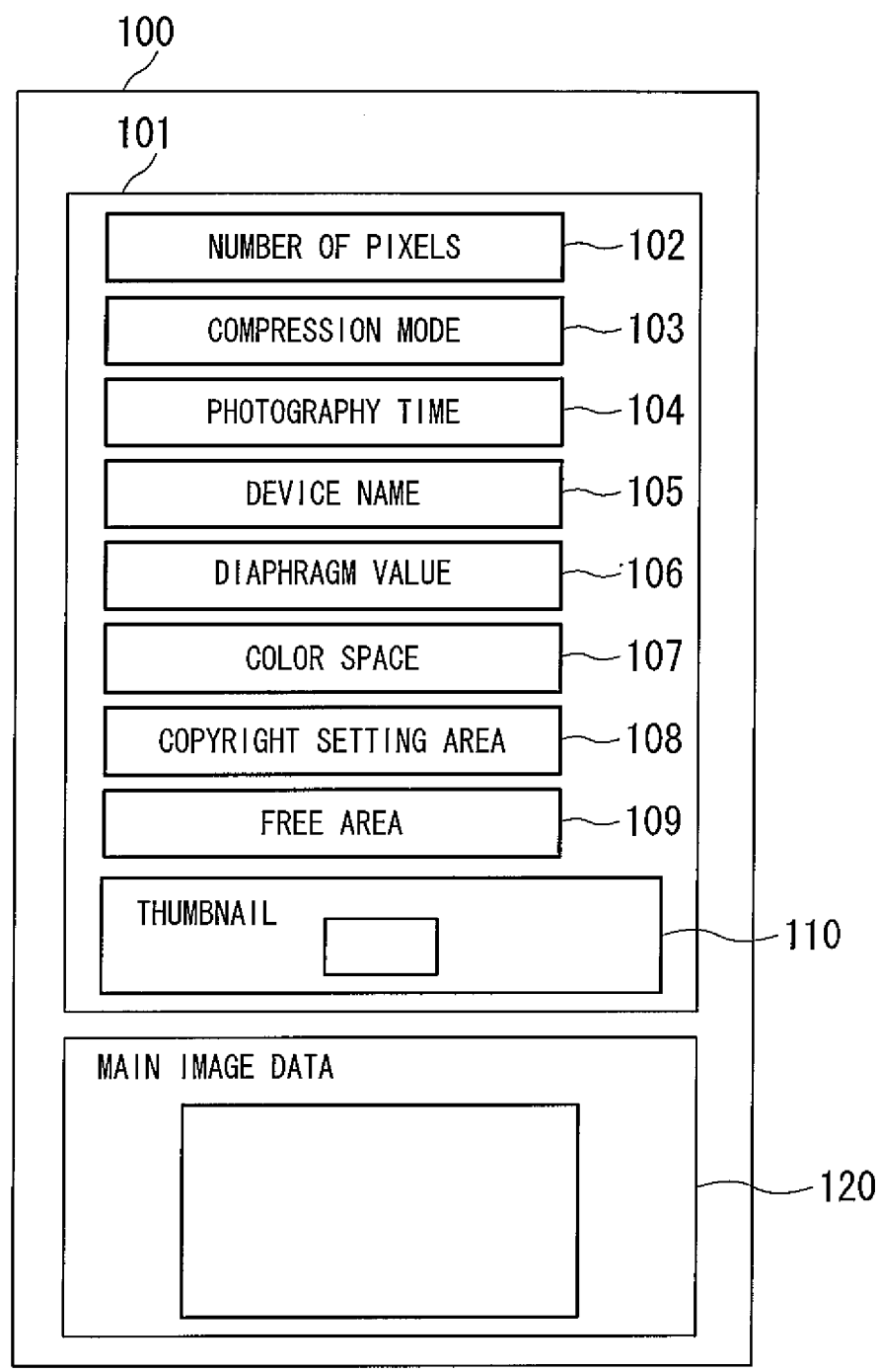
FIG. 2 is a diagram showing the data structure of image data in the embodiment.

FIG. 2 is a diagram showing the data structure of the format assigned to image data 100 printed by the printing apparatus 20. This format may be the Exif format (exchange image file format: a registered trademark) as an extended JPEG image format, which is called the "extended JPEG format" below.

In FIG. 2, the image data 100 consists of a header 101 and main image data 120. The header 101 includes the "number of pixels" 102, the photography time 104, the device name 105, and the diaphragm value 106, which is data defined when the main image data 120 is obtained. The header 101 also includes the compression mode 103, the color space 107, and the like, which is data for accurately reading the main image data 120.

When the user captures an image using the portable terminal apparatus 10, the above data is stored by the portable terminal apparatus 10. When the image data is produced by a producer of paid content, or the like, relevant data is also stored via a software for producing the image.

The header 101 also includes a copyright setting area 108 and a free area 109. With respect to the image data produced by a producer of paid content, or the like, data for indicating that the producer does not resign the copyright, that is, does not permit printing of the image data is set in the copyright setting area 108. This setting is performed by software in accordance with an operation of the producer of paid content. The free area 109 is a reserved area for future use.

The thumbnail 110 is reduced image data of the main image data 120, and the size thereof is predetermined, thereby allowing high-speed screen display of an image data list by using software or the like. The main image data 120 has a main body of the image data, and stores image data based on a JPEG (joint photographic coding experts group) format which can be printed by the printing apparatus 20 in the present embodiment (here, an extended version of the general JPEG).

The file name of the image data 100 having this extended JPEG format is "XXXXX.JPG", that is, the same extension "JPG" as that of the general JPEG file is used. Therefore, in order to distinguish between the image data of the present extended format and image data of the general JPEG format, the header 101 must be checked.

With respect to the copyright setting area 108, the area itself can be deleted when copyright setting is not performed. In this case, no copyright data is present; thus, the user may be permitted to freely print images.

Instead of using the copyright setting area 108, a specific area in the free area 109 may be used for data which indicates the presence or absence of the copyright. This is because the copyright setting area 108 is a common area used by venders of various kinds of printers and digital cameras, and individual usage thereof is restricted.

For example, when a developer of the portable terminal apparatus 10 requests a producer of paid content to produce a top-page image specifically used in the portable terminal apparatus 10, the image data of this top-page image may not be displayed in a portable terminal apparatus developed by another vender, and usage of the copyright setting area 108 may not be permitted. In such a case, a specific area in the free area 109 may be used for setting data of the copyright which is determined in advance by the developer of the portable terminal apparatus 10 and the producer of paid content, so that the presence or absence of the copyright can be determined using the portable terminal apparatus 10.

Figure 3:
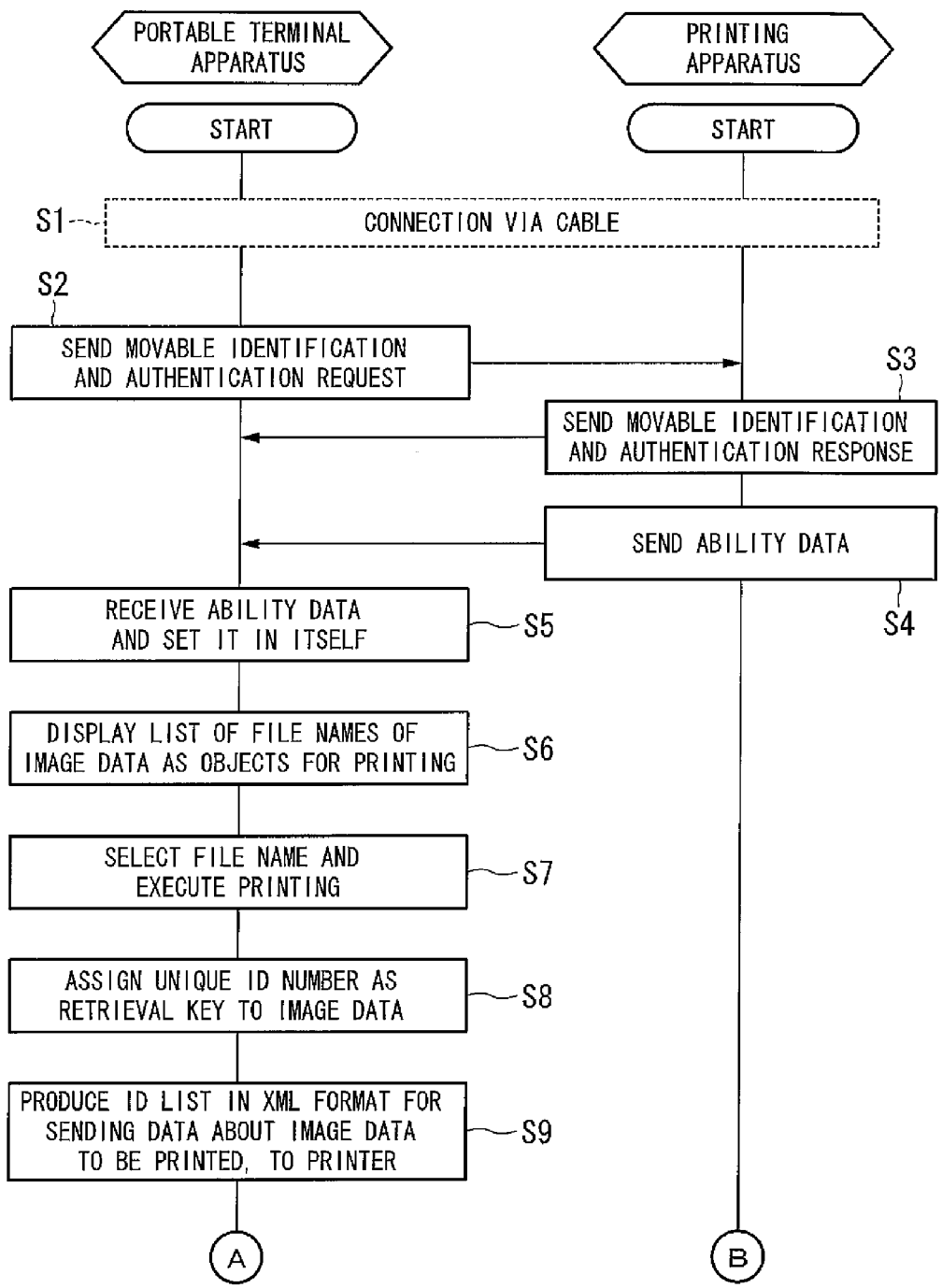
FIG. 3 is a flowchart showing the first half of the printing process in the embodiment.
Figure 4:
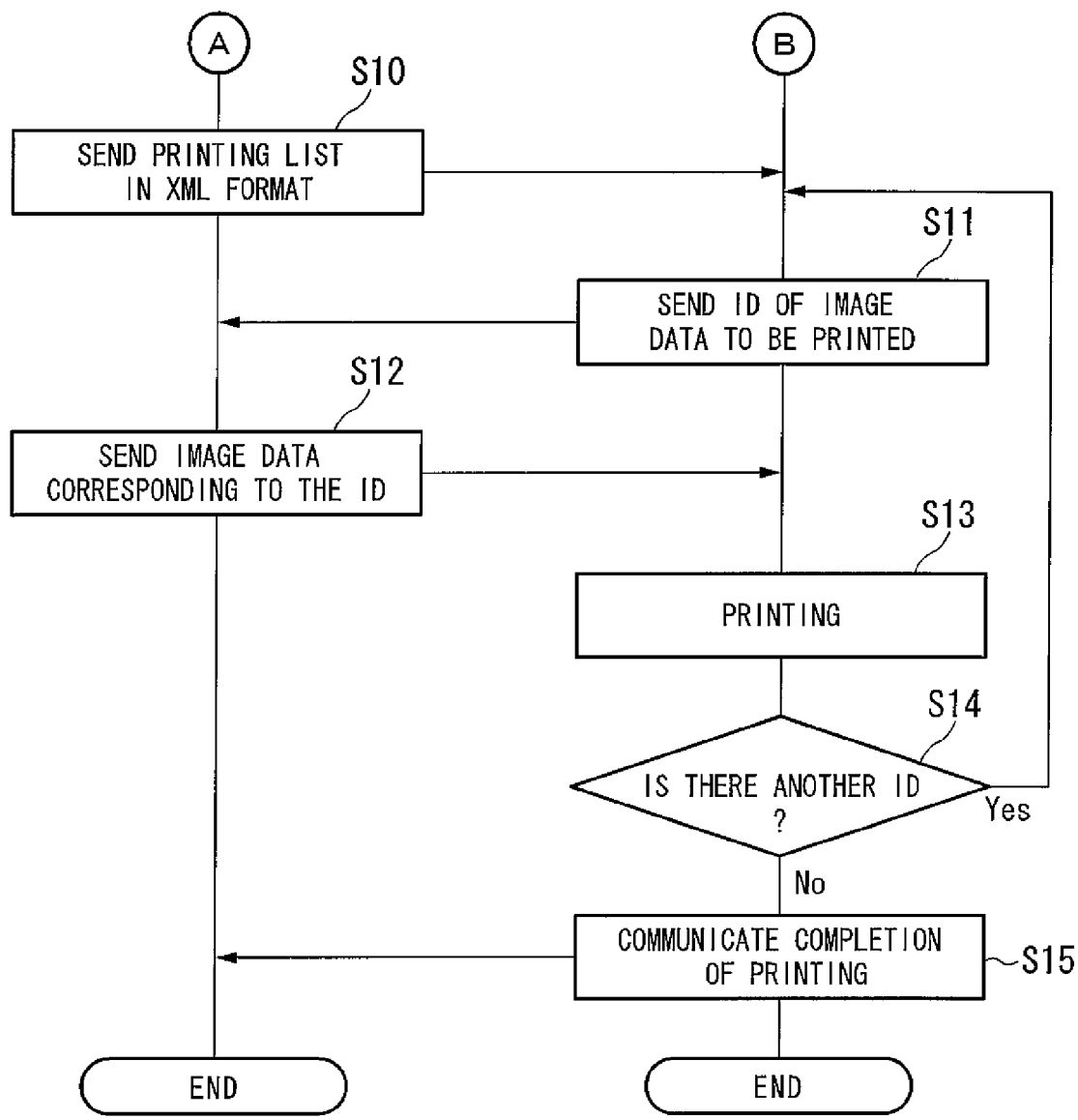
FIG. 4 is a flowchart showing the second half of the printing process in the embodiment.

FIGS. 3 and 4 are flowcharts of the process of printing the image data, performed between the portable terminal apparatus 10 and the printing apparatus 20. In these figures, the step surrounded by dashed lines (see step S1) is performed by the user, and the other steps surrounded by solid lines are executed by the portable terminal apparatus 10 or the printing apparatus 20.

First the portable terminal apparatus 10 and the printing apparatus 20 are connected by the user using a cable (see step S1)

When the cable is connected, connection between the portable terminal apparatus 10 and the printing apparatus 20 is detected via the connection part 16 of the device 10 and the connection part 23 of the apparatus 20. In order to request movable identification and authentication, the control part 13 of the portable terminal apparatus 10 sends a movable identification and authentication request to the printing apparatus 20, where this request includes data of a device class or the like, which is set in advance in the portable terminal apparatus 10 (see step S2).

When the printing apparatus 20 receives the movable identification and authentication request, the movable identification and authentication device 22a of the printing apparatus 20 determines whether the portable terminal apparatus 10 is a device which conforms to the image data sending and receiving method employed by the printing apparatus 20, based on the data included in the movable identification and authentication request. When it is determined that the portable terminal apparatus 10 is such a conformable device, the movable identification and authentication device 22a authenticates the portable terminal apparatus 10, and sends an authentication response (see step S3).

When the portable terminal apparatus 10 is authenticated, the printing apparatus 20 sends ability data to the portable terminal apparatus 10, where the ability data includes the image data format printable by the printing apparatus 20, for example, the data of the extension of files, and the above-described extended JPEG format (see step S4). The portable terminal apparatus 10 sets the received ability data in itself (see step S5).

Next, in accordance with a designation by the user, the portable terminal apparatus 10 reads the file names of the image data as objects for printing, from the image storage part 17, and shows the list of the file names on the display part 11 (see step S6). The user then selects a file name of the image data to be printed, and may select a plurality of file names. The user then designates the start of printing operation (see step S7).

The image sending device 13c which accepts the print start designation by the user assigns an ID number to the image data of each selected file name, where the ID number functions as a retrieval key which can be uniquely identified (see step S8). The image sending device 13c also produces an ID list in an XML (extensible markup language) format, which is used for sending data with respect to the image data to be printed, to the printing apparatus (see step S9).

As shown in FIG. 4, the portable terminal apparatus 10 sends the produced printing list in the XML format to the printing apparatus 20 (see step S10). When receiving the printing list in the XML format, the printing apparatus 20 reads one of the IDs included in the printing list, and sends it to the portable terminal apparatus 10 (see step S11). When the portable terminal apparatus 10 receives the ID, the image sending device 13c of the portable terminal apparatus 10 reads the relevant image data from the image storage part 17 and sends it to the printing apparatus 20 (see step S12). The output part 21 of the printing apparatus 20 prints the received image (see step S13). When the printing is completed, the printing apparatus 20 determines whether another ID, the image data of which has not yet been read, is present in the printing list. When there is such an ID, the process from step S11 to S14 is continuously executed (see step S14). When another ID, the image data of which has not yet been read, is absent, the portable terminal apparatus 10 is informed of the completion of the printing (see step S15).

After the portable terminal apparatus 10 is informed of the completion of the present printing, the cable may be disconnected so as to complete the printing operation, or the portable terminal apparatus 10 may continue the printing operation when the user issues a designation for printing again.

The process from step S6 to step S9 may be independently performed in the portable terminal apparatus 10 before the cable is connected. In this case, these steps are executed before the process from step S1 to step S5.

Instead of reading the file names and showing the list thereof, while a piece of the image data is displayed on the display part 11, this piece of the image data may be printed by selecting "print" included in a sub menu. In this case, only one ID is registered in the printing list in the XML format.

In addition, a list of the thumbnails 110 may be shown. In this case, the user selects each thumbnail instead of the file name, so as to perform printing.

Figure 5:
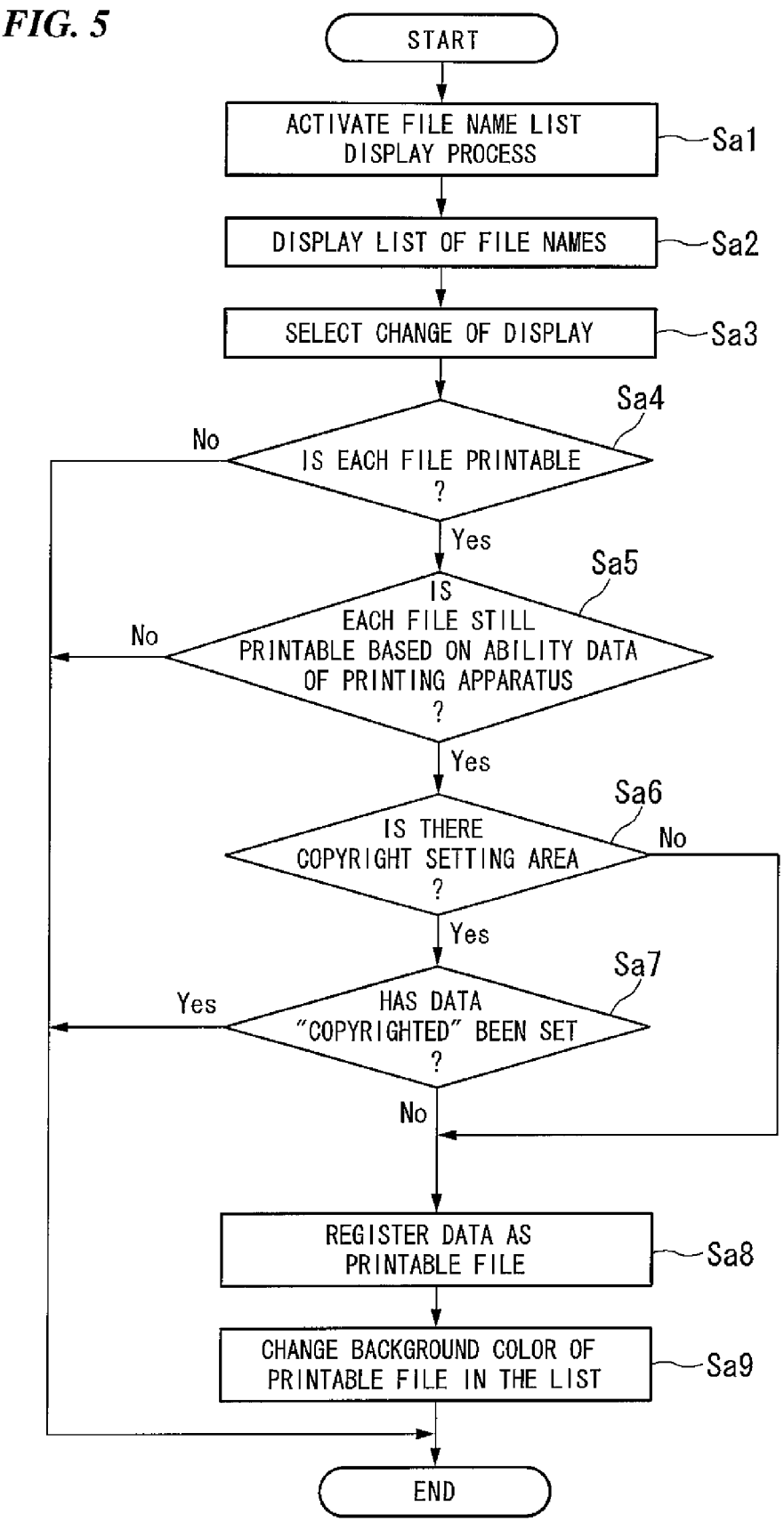
FIG. 5 is a flowchart showing the image data determination process in the embodiment.

FIG. 5 is a flowchart showing an image data determination and display process performed by the determination device 13b and the display control device 13a of the portable terminal apparatus 10. In the above-described printing process, the process of this flowchart is executed in step S6.

First, In accordance with a designation by the user, the control part 13 activates a process of displaying a list of the file names of the image data, read from the image storage part 17 (see step Sa1), and displays the list of the read file names on the display part 11 (see step Sa2). Next, the user performs selection of the sub menu so as to change the display (see step Sa3).

The determination device 13b accepts such a designation of changing the display, and determines whether the image data corresponding to each file name included in the list is printable.

For example, when "JPG" (the extension of a JPEG file) and "GIF" (the extension of a GIF (graphics interchange format) file) are set in advance as the adaptable extensions in the portable terminal apparatus 10 based on the ability data received from the printing apparatus 20, it is determined that printing is possible if the corresponding file name has the extension JPG or GIF. If the corresponding file name has an extension other than JPG or GIF, the present process is terminated (see step Sa4).

Next, based on the data included in the ability data received from the printing apparatus 20, it is further determined whether the relevant image data is printable. For example, when the ability data includes data of the extension JPG and the extended JPEG format, it is determined whether the image data has the extended JPEG format. When it is determined that the image data does not have the extended JPEG format, the present process is terminated (see step Sa5).

When it is determined that the image data has the extended JPEG format, it is further determined whether the copyright setting area 108 is present in the header 101. When no copyright setting area 108 is present, it is determined that printing can be freely performed and the relevant image data is printable, and the operation proceeds to the next step (see step Sa6). When the copyright setting area 108 is present, it is further determined whether the setting is "copyrighted" or "not-copyrighted".

More specifically, in the copyright setting area 108, when the relevant image data is copyrighted, a character sequence "KENNRI01" has been set, and when it is not copyrighted, a character sequence "KENNTI00" has been set. When such a character sequence can be detected, and the detected character sequence indicates the "copyrighted" state, printing cannot be performed, and the present process is terminated (see step Sa7). Next, the image data, which has no copyright or no copyright setting area 108, is registered as printable image data (see step Sa8). The display control device 13a changes the background color of the printable file(s), and displays the file names on the display part 11 (see step Sa9).

After the present process, the user can select only the image data having the color-changed background, as the file which can be printed. In addition, as described above, the copyright setting area 108 may be omitted, and the above-described character sequence may be included in the free area 109.

When the list of the file names is displayed in step Sa1, only the file names corresponding to a search character sequence (or string) input by the user may be retrieved and displayed.

Additionally, instead of displaying the list of the file names as in the above flowchart, a list of the thumbnails may be displayed.

FIGS. 6A to 6E are diagrams showing a series of displays in the portable terminal apparatus 10, produced in the above process of determining whether the printing is possible.

Figure 6A:
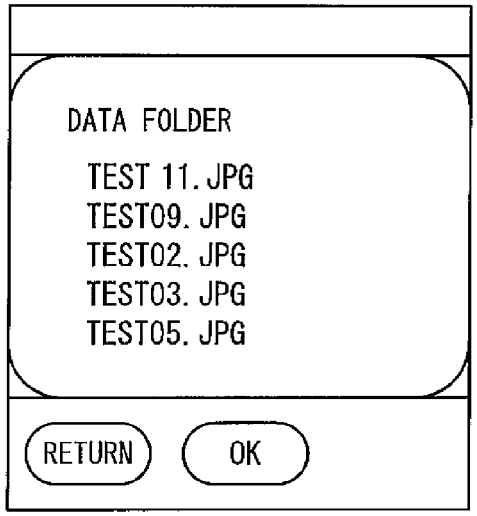
FIG. 6A shows an example of the display, produced when the setting for changing the background color is performed.

FIG. 6A is a display when the user activates the listing process, so that the list of the file names of the image data stored in the image storage part 17 is displayed.

Figure 6B:
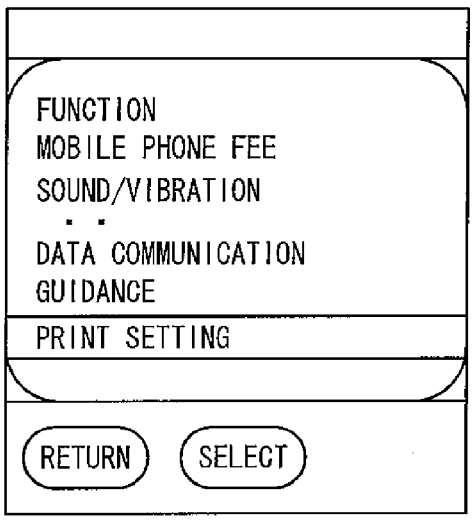
FIG. 6B similarly shows an example of the display, produced when the setting for changing the background color is performed.

FIG. 6B is a display when the user selects the sub menu after the user obtains the displayed file name list.

Figure 6C:
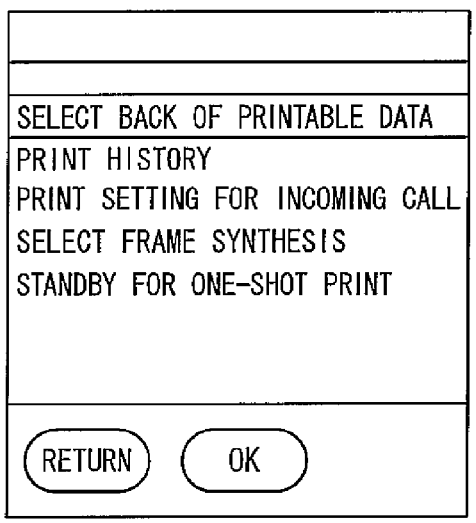
FIG. 6C similarly shows an example of the display, produced when the setting for changing the background color is performed.

In FIG. 6B, when the user selects the item "print setting", the display is switched to FIG. 6C. In FIG. 6C, when the user selects the item "select back of printable data", the display is switched to FIG. 6D.

Figure 6D:
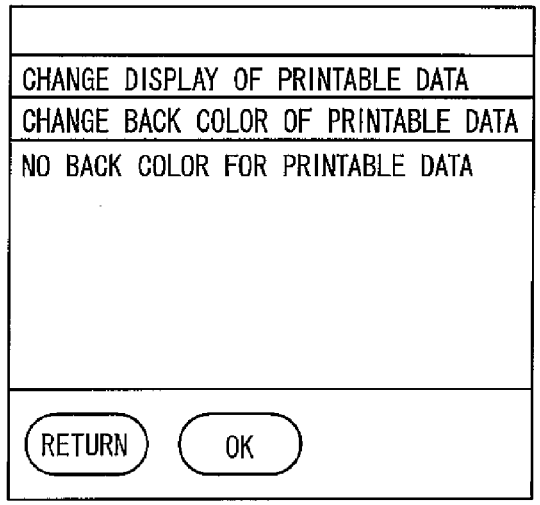
FIG. 6D similarly shows an example of the display, produced when the setting for changing the background color is performed.
Figure 6E:
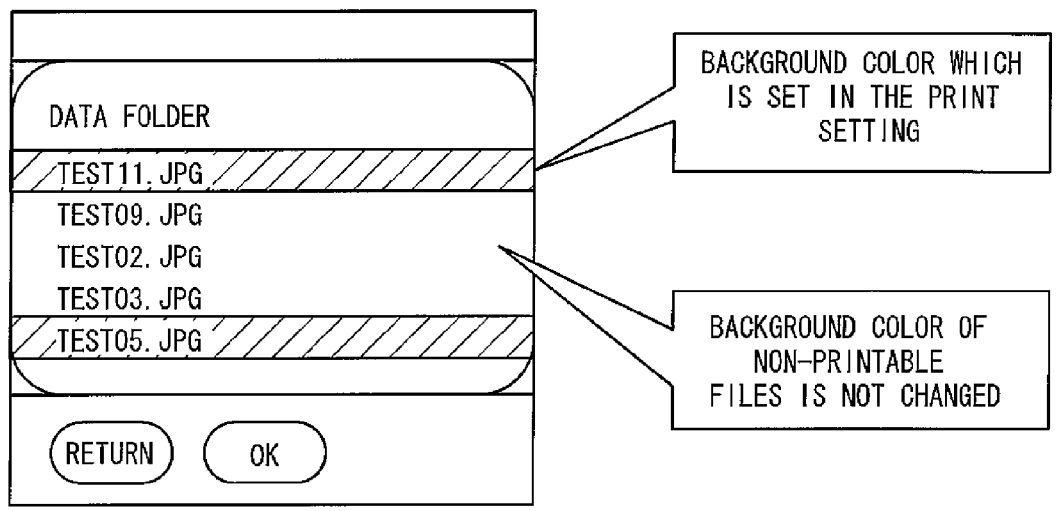
FIG. 6E similarly shows an example of the display, produced when the setting for changing the background color is performed.

In FIG. 6D, when selecting the item "change back color of printable data", the above process for determining whether the image data is printable is performed, and the display is changed to FIG. 6E. In FIG. 6E, the background color of only the printable file is changed.

Figure 7A:
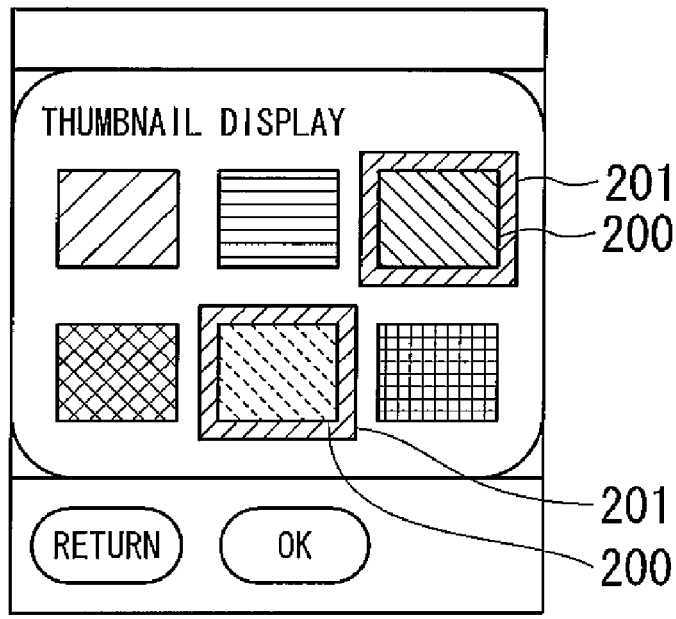
FIG. 7A shows an example of the display in which reduced image data is displayed in the embodiment.

FIG. 7A shows a display in which the thumbnails are displayed instead of displaying the file names of the image data as the objects for printing. In this case of displaying the thumbnails, the background color of the printable files is changed. Specifically, a background color area 201 is attached as a border for printable image data 200.

The thumbnail is reduced image data. Therefore, printable thumbnails may be directly displayed, and non-printable thumbnails may be displayed using a gray scale or the like. In another example for displaying the thumbnails, the thumbnails of non-printable image data may not be displayed.

Figure 7B:
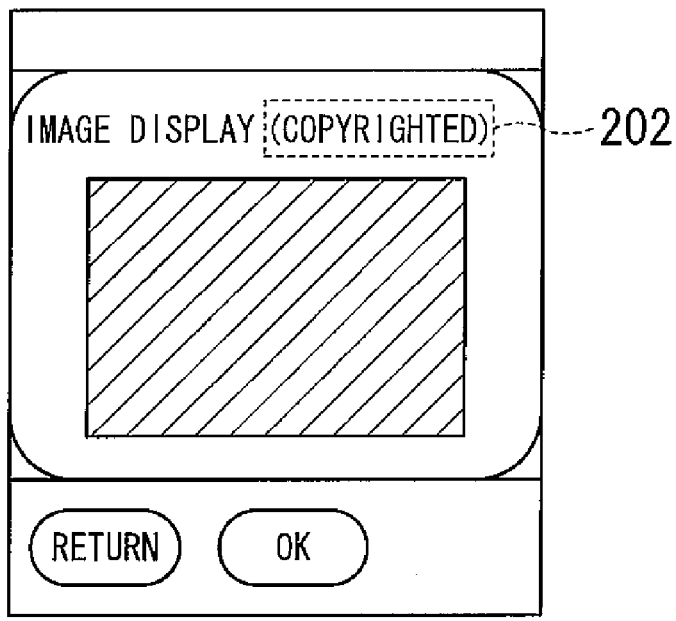
FIG. 7B shows an example of the display in which image data itself is displayed in the embodiment.

FIG. 7B shows a display when the image data itself is shown as the object for printing. In this case, a character data 202 (e.g., "copyrighted") for indicating that the image is printable or non-printable may be displayed. In addition, as in the above case of displaying the thumbnails, printable image data may be directly displayed, and non-printable image data may be displayed using a gray scale. In another example, non-printable image data may not be displayed, or printable image data may be displayed with a color-changed background.

FIGS. 7A and 7B show the displays after the setting for allowing the user to distinguish the printable image data is performed. The user can even refer to the copyrighted image data on the display screen.

In addition, in order to change the background color or the like so that the user can distinguish the image data, the background color may be changed when the list is displayed for the first time.

Figure 8A:
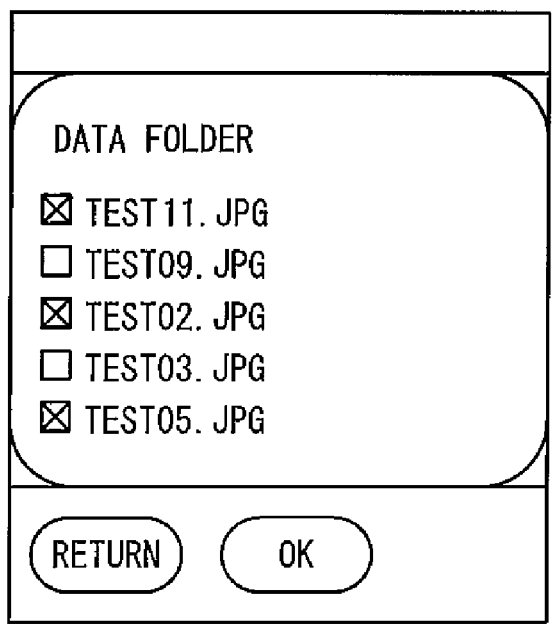
FIG. 8A shows an example of the display, produced when the objects for printing is predetermined before the determination process in the embodiment.
Figure 8B:
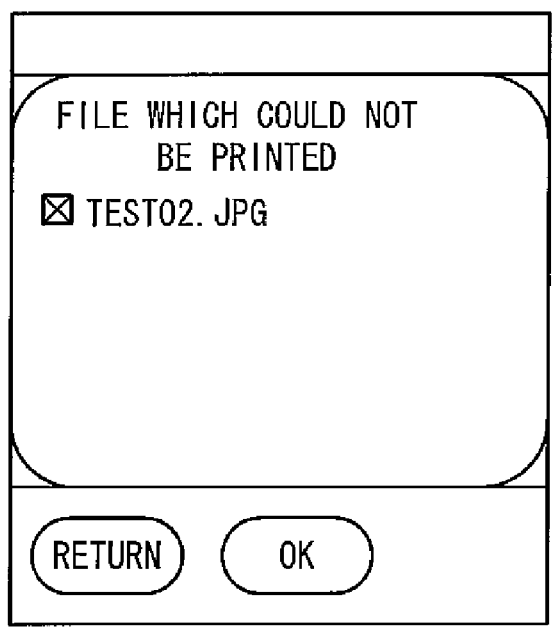
FIG. 8B similarly shows an example of the display, produced when the objects for printing is predetermined before the determination process in the embodiment.

FIGS. 8A and 8B show a series of displays when the printing is performed after the user selects the image data without discriminating whether the image data is printable.

FIG. 8A shows a display in which a list of the file names of the image data stored in the image storage part 17 is shown, and a check box is appended to each file name. The user provides a check (mark) in the check box of the desired image data for printing. When the printing is executed, the image data having the check in the check box is subjected to the above-described determination process. With respect to the printable image data, an ID is provided to each piece of the image data, and the image data is sent to the printing apparatus 20. If the image data is non-printable, the result of processing is displayed as shown in FIG. 8B.

Figure 9A:
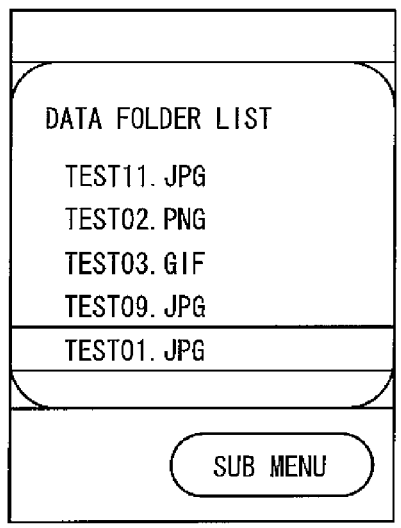
FIG. 9A shows an example of the display, produced when detailed data of the image data is displayed.
Figure 9B:
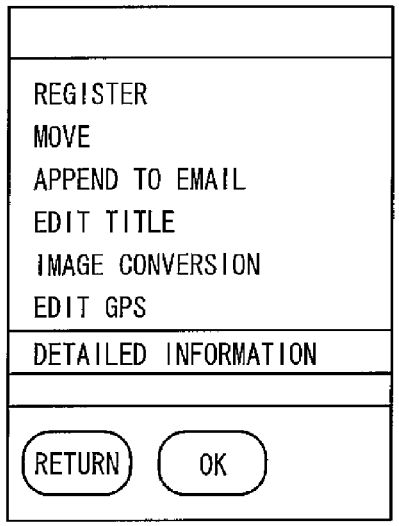
FIG. 9B similarly shows an example of the display, produced when detailed data of the image data is displayed.
Figure 9C:
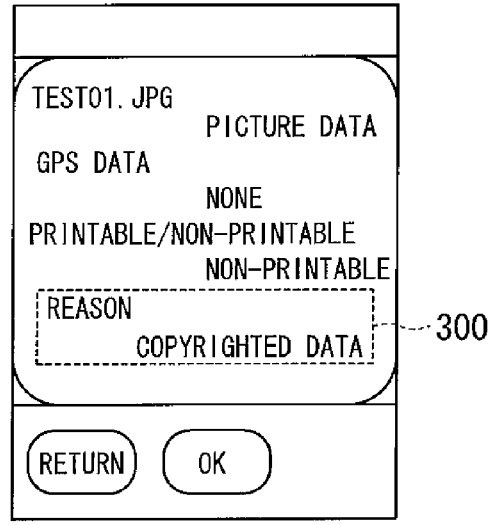
FIG. 9C similarly shows an example of the display, produced when detailed data of the image data is displayed.

FIGS. 9A to 9C show a series of displays when the user confirms whether the image data stored in the image storage part 17 of the portable terminal apparatus 10 is copyrighted regardless of whether the user prints the image data or not.

In FIG. 9A, a desired file name for the confirmation is selected from among the file names in the list. Here, "TEST01.JPG" is selected. When the sub menu is selected, the menu in FIG. 9B is shown. When selecting "detailed information" in this menu, the information about the relevant image data is displayed as shown in FIG. 9C. FIG. 9C includes an item "reason" in which "copyrighted data" is shown, so that the user can recognize that "TEST01.JPG" cannot be printed.

In the above embodiment, the image data 100 includes the header 101; however, the image data may include a footer having a structure identical to that of the header 101.

As explained above, in the portable terminal apparatus of the present embodiment, it is confirmed whether the portable terminal apparatus is a device which conforms to the image data sending and receiving method employed by an image forming apparatus which can print image data, and the portable terminal apparatus receives the data of the printable image format from the image forming apparatus. The portable terminal apparatus has an image storage part for storing each piece of the image data, and a display device for displaying "image (data) identification data" for identifying each piece of the image data stored in the image storage part in accordance with an operation by the user. It is determined whether each piece of the image data stored in the image storage part is printable, based on at least one of a result of the confirmation with respect to the image data sending and receiving method, the image format information, and the image data. Based on a result of the determination, display of the display device is controlled so that the user is able to distinguish whether each piece of the image data displayed on the display device is printable. When the user selects desired image data for printing and enters a command for printing, printable image data (among the desired image data) determined by the determination device is sent to the image forming device.

Therefore, the user can confirm the image identification data of printable image data on the display, and it is possible to send only the printable image data to the image forming apparatus. Accordingly, with respect to the copyrighted image data, the user can recognize that it is non-printable, and it is possible to prevent the non-printable image data from being sent to the image forming apparatus.

When the image identification data can be shown on the display in a manner such that a first background color is used when the image data is printable, and a second background color is used when the image data is non-printable. Therefore, the user can distinguish between the printable image data and the non-printable image data in accordance with the difference in the background color.

In addition, it is possible that the image identification data of non-printable image data is not shown on the display while the image identification data of printable image data is shown on the display. Therefore, the user can perform selection among the printable image data while being unconscious of the non-printable image data.

In an example, to each piece of the image data stored in the image storage part, a file name is assigned which includes an extension indicating a format of the relevant image data. When the extension conforms to the image format information received from the image forming apparatus, it can be determined that the relevant image data is printable. Therefore, it is possible to distinguish in advance based on the extension, the image data which cannot be printed by the image forming apparatus; thus, it is possible to show the user that the relevant data is non-printable, and to prevent such data from being sent to the image forming apparatus.

In another example, the printable image format is a predetermined data format including a header or a footer, and when the relevant image data does not conform to the predetermined data format, it is determined that the relevant image data is non-printable. Accordingly, it is possible to distinguish in advance based on the data format, the image data which cannot be printed by the image forming apparatus; thus, it is possible to show the user that the relevant data is non-printable, and to prevent such data from being sent to the image forming apparatus.

When the header or the footer of the predetermined data format does not include a specific data for determining whether printing is permitted, it can be determined that the relevant image data is printable. Therefore, if the specific data is copyright setting data, then with respect to the image data having no copyright data, the user can be shown that it is printable, and it can be sent to the image forming apparatus to be printed.

If the header or the footer of the predetermined data format includes a specific data for determining whether printing is permitted and the specific data indicates that the printing is permitted, it can be determined that the relevant image data is printable. However, if the specific data indicates that the printing is not permitted, it can be determined that the relevant image data is non-printable. Therefore, if the specific data is copyright setting data, and data for showing that the printing is permitted indicates that no copyright is set while data for showing that the printing is prohibited indicates that copyright is set, then determination with respect to the copyright data can be performed so as to show the user whether the relevant image data is printable. In addition, when copyright is set, it is possible not to send the relevant image data to the image forming apparatus.

Additionally, when the image format information is received from the image forming apparatus, data of specific extension or data format included in the image format information may be stored in an inner storage area of the portable terminal apparatus. Therefore, if printable image data depends on the type of the image forming apparatus, the determination process can be performed based on the data received from the image forming apparatus without an operation by the user for registering revised data of the specific extension or data format in the portable terminal apparatus.

It is also possible to access a network to which a server apparatus is connected, which stores image data therein, receive the image data from the server apparatus, and store the image data in the image storage part. Therefore, similar to image data obtained using a camera or the like, the image data received from the server apparatus can also be subjected to the above-described determination process, and it is possible to prevent the image data such as paid content, whose copyright is not free, from being printed.

The above-described portable terminal apparatus includes a computer system. The above-described image data determination and display process is stored as a program in a computer-readable storage medium, and is executed when the computer reads and executes this program. The computer-readable storage medium is a magnetic disk, a magneto-optical disk, a CD-ROM, a DVD-ROM, a semiconductor memory, or the like. The computer program may be transmitted via a communication line to a computer, and the computer that receives the program may execute the program.

INDUSTRIAL APPLICABILITY

The user can distinguish image data, printing of which is not permitted due to copyright setting or the like, and printing of such image data can be restricted.

The invention claimed is:

1. A portable terminal apparatus comprising:
an image storage part for storing a plurality of image data;
a display device for displaying image identification data for identifying each piece of the image data stored in the image storage part, in accordance with an operation by a user of the portable terminal apparatus, wherein each piece of the image identification data is linked with a corresponding piece of the image data;
a determination device for determining whether each piece of the image data stored in the image storage part is printable, based on the image data;
a display control device for displaying only the image identification data of printable image data on the display device; and
an image sending device for creating a retrieval key corresponding to a selected printable image data, wherein
the display control device does not display the image identification data of non-printable image data on the display device, and
the image sending device transmits the retrieval key in place of an image data file name to an image forming apparatus, and sends the image data to the image forming apparatus based on the retrieval key received from the image forming apparatus.

2. The portable terminal apparatus in accordance with claim 1, further comprising: a connection device for outputting a signal of the image data.

3. The portable terminal apparatus in accordance with claim 2, further comprising: a confirmation device for confirming an image data sending and receiving method to which an image forming apparatus connected via the connection device can be adapted, wherein: the determination device determines whether each piece of the image data stored in the image storage part is printable, based on at least one of a result of the confirmation performed by the confirmation device, and the image data.

4. The portable terminal apparatus in accordance with claim 2, further comprising: a receiving device for receiving image format information of a printable image format from an image forming apparatus connected via the connection device, wherein: the determination device determines whether each piece of the image data stored in the image storage part is printable, based on at least one of the image format information and the image data.

5. The portable terminal apparatus in accordance with claim 2, further comprising: an image sending device for outputting a signal of the image data using the connection device when the user selects desired image data for printing and enters a command for printing, wherein among the desired image data, printable image data determined by the determination device is output by the image sending device.

6. The portable terminal apparatus in accordance with claim 1, wherein:
each piece of the image identification data is a file name assigned to the corresponding piece of the image data; and
the image storage part stores each piece of the image data and the corresponding file name, which are associated with each other.

7. The portable terminal apparatus in accordance with claim 1, wherein:
each piece of the image identification data is the corresponding piece of the image data itself stored in the image storage part.

8. The portable terminal apparatus in accordance with claim 1, wherein:
each piece of the image identification data is reduced image data obtained by reducing the corresponding piece of the image data stored in the image storage part; and
the image storage part stores each piece of the image data and the reduced data corresponding thereto, which are associated with each other.

9. The portable terminal apparatus in accordance with claim 1, wherein:
each piece of the image data stored in the image storage part includes copyright setting data for indicating whether the relevant image data is copyrighted; and
when the copyright setting data indicates that the image data is copyrighted, the determination device determines that the relevant image data is non-printable.

10. The portable terminal apparatus in accordance with claim 4, wherein:
   to each piece of the image data stored in the image storage part, a file name is assigned which includes an extension indicating a format of the relevant image data; and
   when the extension conforms to the image format information received by the receiving device, the determination device determines that the relevant image data is printable.

11. The portable terminal apparatus in accordance with claim 4, wherein:
   the printable image format is a predetermined data format including a header or a footer; and
   when the relevant image data does not conform to the predetermined data format, the determination device determines that the relevant image data is non-printable.

12. The portable terminal apparatus in accordance with claim 11, wherein:
   when the header or the footer of the predetermined data format does not include a specific data for determining whether printing is permitted, the determination device determines that the relevant image data is printable.

13. The portable terminal apparatus in accordance with claim 11, wherein:
   when the header or the footer of the predetermined data format includes a specific data for determining whether printing is permitted,
   if the specific data includes data which indicates that the printing is permitted, the determination device determines that the relevant image data is printable, and
   if the specific data includes data which indicates that the printing is not permitted, the determination device determines that the relevant image data is non-printable.

14. The portable terminal apparatus in accordance with claim 11, further comprising:
   means for storing, in an inner storage area thereof, data of the predetermined data format included in the image format information when the image format information is received by the receiving device.

15. The portable terminal apparatus in accordance with claim 1, further comprising:
   a communication part connected via a network to a server apparatus which stores image data; and
   a storage device for storing the image data into the image storage part when the image data is received via the communication part from the server apparatus.

16. A printing system having an image forming apparatus for printing image data and a portable terminal apparatus connected to the image forming apparatus, wherein:
   the portable terminal apparatus comprises:
       a connection device connected to the image forming apparatus;
       a confirmation device for confirming, between the portable terminal apparatus and the image forming apparatus, an image data sending and receiving method to which the image forming apparatus can be adapted;
       a receiving device for receiving image format information of a printable image format from the image forming apparatus;
       an image storage part for storing a plurality of image data;
       a display device for displaying image identification data for identifying each piece of the image data stored in the image storage part, in accordance with an operation by a user of the portable terminal apparatus, wherein each piece of the image identification data is linked with a corresponding piece of the image data;
       a determination device for determining whether each piece of the image data stored in the image storage part is printable, based on at least one of a result of the confirmation performed by the confirmation device, the image format information, and the image data;
       a display control device for displaying only the image identification data of printable image data on the display device; and
       an image sending device for creating a retrieval key corresponding to a selected printable image data, wherein the image sending device transmits the retrieval key in place of an image data file name to the image forming apparatus, and for sending the image data to the image forming apparatus based on the retrieval key received from the image forming apparatus when the user selects desired image data for printing and enters a command for printing, wherein among the desired image data, printable image data determined by the determination device is sent to the image forming device,
       wherein the display control device does not display the image identification data of non-printable image data on the display device,
   and the image forming apparatus comprises:
       an ability data sending device for sending the image format information to the portable terminal apparatus;
       an image receiving device for receiving the image data sent from the portable terminal apparatus; and
       an output device for outputting the image data received by the image data as a print.

17. A printing method comprising the steps of:
   storing a plurality of image data;
   displaying image identification data for identifying each piece of the stored image data, in accordance with an operation by a user of the portable terminal apparatus, wherein each piece of the image identification data is linked with a corresponding piece of the image data;
   determining whether each piece of the stored image data is printable, based on the image data;
   displaying only the image identification data of printable image data;
   controlling not to display the image identification data of non-printable image data;
   creating a retrieval key corresponding to a selected printable image data;
   transmitting the retrieval key in place of an image data file name to an image forming apparatus; and
   sending the image data to the image forming apparatus based on the retrieval key received from the image forming apparatus.

* * * * *